Patented Jan. 7, 1936

2,027,030

UNITED STATES PATENT OFFICE 2,027,030

THIAZOLINE COMPOUND

Max Engelmann, Wilmington, Del., assignor to E. I. du Pont de Nemours & Company, Wilmington, Del., a corporation of Delaware No Drawing. Application July 22, 1932, Serial No. 624,057

8 Claims. (Cl. 260—44)

This invention relates to carbon compounds, specifically dihydrothiazoles (also called thiazolines) and more particularly to substituted phenyl-imino-dihydrothiazoles.

It is an object of this invention to prepare novel substituted arylimino-dihydrothiazoles, which possess valuable local-anesthetic properties. Other objects are the preparation of compounds of the aforementioned class in a very desirable physical state and in a high degree of purity, their preparation by novel and/or economical chemical processes and in general an advancement of the art. Other objects will appear hereinafter.

Generally speaking, the objects of this invention are accomplished by reacting substituted phenyl-isothio-cyanates with halogen-ethyl-amines. The reaction taking place is probably indicated by the following equation:

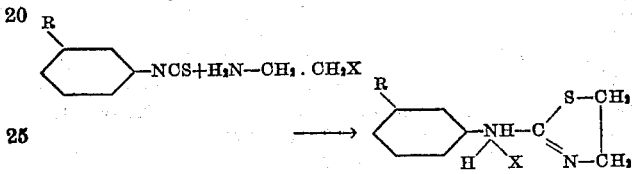

(R=a substituent, X=halogen.)

The invention will be further understood from a consideration of the following detailed description and the specific examples in which the parts are given by weight.

Example I

Forty-one (41) parts of bromo-ethyl-amine-hydrobromide were suspended in 120 parts of benzene. To this suspension 40 parts of 50% potassium hydrate solution previously cooled to about 5° C. were added and the whole mixture agitated for a few minutes in a separatory funnel. The water solution containing the potassium bromide formed and a small excess of alkali was removed from the benzene solution of the bromo-ethyl-amine. Thereafter the benzene solution was dried with a small piece of potassium hydrate and 30 parts of para-methyl-phenyl-isothiocyanate (para-methyl-phenyl mustard oil) were added. Some heat was generated and very soon a crystalline product separated from the solution. This product, the hydrobromide salt of the new base, was filtered off after the reaction mass was cooled down to room temperature, dissolved in water, neutralized with ammonia water, filtered off, dried and recrystallized from ethyl alcohol. The product was identified as para-methyl-phenyl-imino-dihydrothiazole and it had a melting point of 131° C. It is soluble in acetone, alcohol and aqueous acid solutions, both organic and inorganic. It is practically insoluble in water. The hydrochloric acid salt was prepared and found to have a melting point of 154° C. This hydrochloride is very soluble in water, acetone and alcohol. It was found to be insoluble in diethyl ether.

Example II

Thirty-four (34) parts of chloro-ethyl-amine-hydrochloride were suspended in 150 parts of benzene. To the resultant, 40 parts of a 50% sodium hydrate solution having a temperature of 5° C. were added. After the mixture was agitated for a few minutes the water solution was separated from the benzene solution which latter contained free chloro-ethyl-amine. After drying the benzene solution with potassium carbonate, 30.6 parts of para-fluoro-phenyl-isothiocyanate were added. The separation of solid para-fluoro-phenyl-imino-dihydrothiazole hydrochloride started immediately. This product was filtered off after one-half hour, dissolved in water, neutralized with ammonia water, and the product thus obtained filtered off. It was recrystallized from ethyl alcohol. The melting point of the free base was found to be 152–153° C. The base is soluble in alcohol and difficultly soluble in benzene, toluene and diethyl-ether. The hydrochloride of this product melts at 134° C.

Example III

By following the procedure set out in Example I and utilizing proportionate quantities of the corresponding materials, ortho-N-butyloxy-phenyl-imino-dihydrothiazole having a melting point of 68° C. was prepared.

Example IV

By a process similar to that set out in the above examples para-hydroxy-phenyl-imino-dihydrothiazole having a melting point of 154° C. was prepared. Its hydrochloride melted at 238–239° C.

Example V

In a manner similar to that described above, para-ethoxy-phenyl-imino-dihydrothiazole melting at 140° C. was prepared.

Example VI

By treating para-hydroxy-meta-methoxy-phenyl-isothiocyanate in the manner previously described, para-hydroxy-meta-methoxy-phenyl-imino-dihydrothiazole melting at 168-169° C. was prepared. Its hydrochloride was found to have a melting point of 211° C.

The processes above described are applicable to the manufacture of substituted aryl-imino-dihydrothiazoles in general. Of particular interest, however, are compounds of the general formula

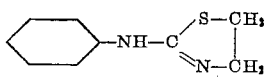

in which the phenyl nucleus is substituted by one or several non-acidic substituents such as halogen, alkyl, hydroxy, alkoxy, and thioalkyl. It has been found that compounds of this type are characterized by remarkable powers as local anesthetics, which is quite surprising when compared with the barely perceptible effects producible by unsubstituted phenyl-imino-dihydrothiazole.

Substituent radicals which produce especially desirable results include methyl, ethyl, propyl, isopropyl, butyl, isobutyl, amyl, isoamyl, hexyl, heptyl, allyl, benzyl, vinyl, methoxy, ethoxy, propoxy, isopropoxy, butyloxy, isobutyloxy, amyloxy, phenyl, naphthyl, chlorine, bromine, phenyloxy, naphthyloxy, methyl-thiohydroxyl, ethyl-thiohydroxyl, isopropyl-thiohydroxyl and amyl-thiohydroxyl. It will be noted that these substituents are of a non-acidic character, in the sense that they do not neutralize the basicity of the compound or deprive it of its capacity to form a salt with HCl. The compound para-methoxy-imino-dihydrothiazole, its hydrochloride hydrobromide, phosphate and nitrate are of particular interest.

The invention is not limited to the use of benzene as a suspension agent. Where desired such compounds as ethylene dichloride, chlorobenzene, carbon tetrachloride, nitrobenzene, glacial acetic acid and nitrotoluene may be used. Where desired the elimination of the suspension agent may be accomplished by adding the mustard oil directly to an excess of the halogen ethyl-amine.

These compounds readily form acid salts, for example, the hydrochloride, the hydrobromide, the oxalate, the formate, the nitrate, the chloracetate, the disulphate (thiazoline 2.H$_2$SO$_4$), picrate, and the diphosphate (thiazoline 2.H$_3$PO$_4$).

These products are stable bodies of basic character and have valuable local anesthetic properties.

As many apparently widely different embodiments may be made of this invention without departing from the spirit and scope thereof, it is to be understood that I do not limit myself to the specific embodiments thereof except as defined in the appended claims.

It may be that in some instances the compounds produced according to this invention exist in a tautomeric form. Such compounds are regarded as a part of this invention and whenever formulae or names are used in this application it is intended that the compound be covered regardless of the tautomeric form in which it actually exists.

I claim:

1. A compound of the general formula

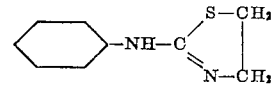

wherein the phenyl ring is substituted by at least one substituent which does not neutralize the basicity of the compound or deprive it of its capacity to form a salt with HCl, said compound being characterized by the property of producing local anesthesia.

2. A compound of the general formula

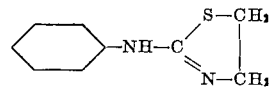

wherein the phenyl ring is substituted by at least one substituent of the group consisting of halogen, alkyl, hydroxy, alkoxy, and thioalkyl, said compound being characterized by the property of producing local anesthesia.

3. Para-methyl-phenylimino-dihydro-thiazole.

4. Para-halogen-phenylimino-dihydro-thiazole.

5. Alkoxyphenylimino-dihydro-thiazoles.

6. Para-ethoxy-phenylimino-dihydro-thiazoles.

7. The process of producing a compound of the general formula as defined in claim 1, which comprises reacting a beta-halogen-ethylamine in an inert organic medium with a phenyl isothiocyanate of the general formula

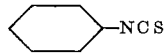

wherein the phenyl nucleus is substituted by at least one substituent which does not neutralize the basicity of the compound or deprive it of its capacity to form a salt with HCl.

8. A process of producing a phenyl-thiazole compound, which comprises reacting a beta-halogen-ethyl-amine with a phenyl-isothiocyanate of the general formula

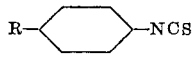

wherein R stands for halogen, alkyl, hydroxy, alkoxy, and thioalkyl, in an inert organic solvent.

MAX ENGELMANN.